United States Patent [19]

Magoveny et al.

[11] 4,047,834
[45] Sept. 13, 1977

[54] HORIZONTAL MULTIDIRECTIONAL TURBINE WINDMILL

[75] Inventors: George S. Magoveny; Eric J. Forgo, both of North Haven, Conn.

[73] Assignee: Windsunwatt, Inc., New Haven, Conn.

[21] Appl. No.: 642,240

[22] Filed: Dec. 18, 1975

Related U.S. Application Data

[63] Continuation-in-part of Ser. No. 482,355, June 24, 1974, Pat. No. 3,938,907.

[51] Int. Cl.² ............................................. F03D 7/06
[52] U.S. Cl. ......................................... 415/3; 290/55; 416/119
[58] Field of Search ................ 415/2, 3, 4; 290/43, 290/44, 54, 55

[56] References Cited

FOREIGN PATENT DOCUMENTS

| 23,282 | 7/1918 | Denmark | 415/2 |
| 515,879 | 4/1921 | France | 415/2 |
| 593,840 | 9/1925 | France | 415/2 |
| 1,111,673 | 3/1956 | France | 415/3 |

Primary Examiner—Robert K. Schaefer
Assistant Examiner—Eugene S. Indyk
Attorney, Agent, or Firm—DeLio and Montgomery

[57] ABSTRACT

A horizontal multidirectional turbine windmill comprising a housing having apertures on all sides for ingress and egress of air and a rotor on a drive shaft within the housing, each aperture being the larger end of a funnel-shaped passage, the smaller ends of said passages being positioned to deliver air at relatively high velocities against the rotor buckets, the air entering the housing through one or more apertures on the windward side thereof and being exhausted through apertures on the leeward side. The housing is preferably so shaped that ambient air impinging on the housing surface without entering an aperture will flow around the housing and create a low pressure zone adjacent the exhaust funnel apertures, and the housing is also preferably so shaped that a plurality of units can be stacked vertically with their drive shafts coupled together. The rotor buckets may be flexible, with provision for varying their profiles automatically as a function of wind and rotational speed.

5 Claims, 16 Drawing Figures

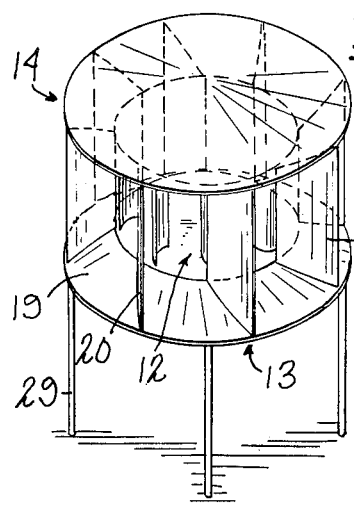
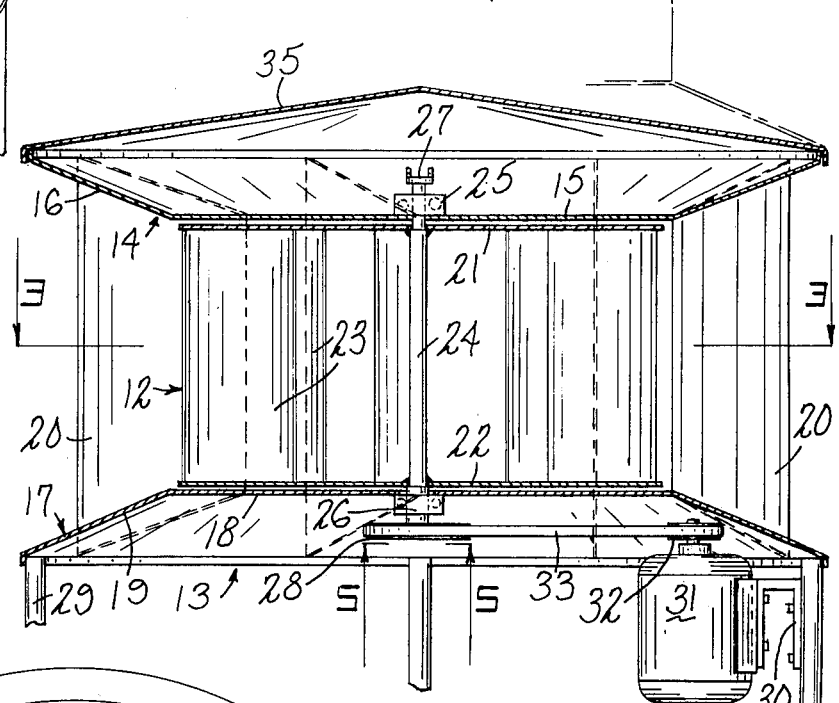
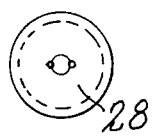
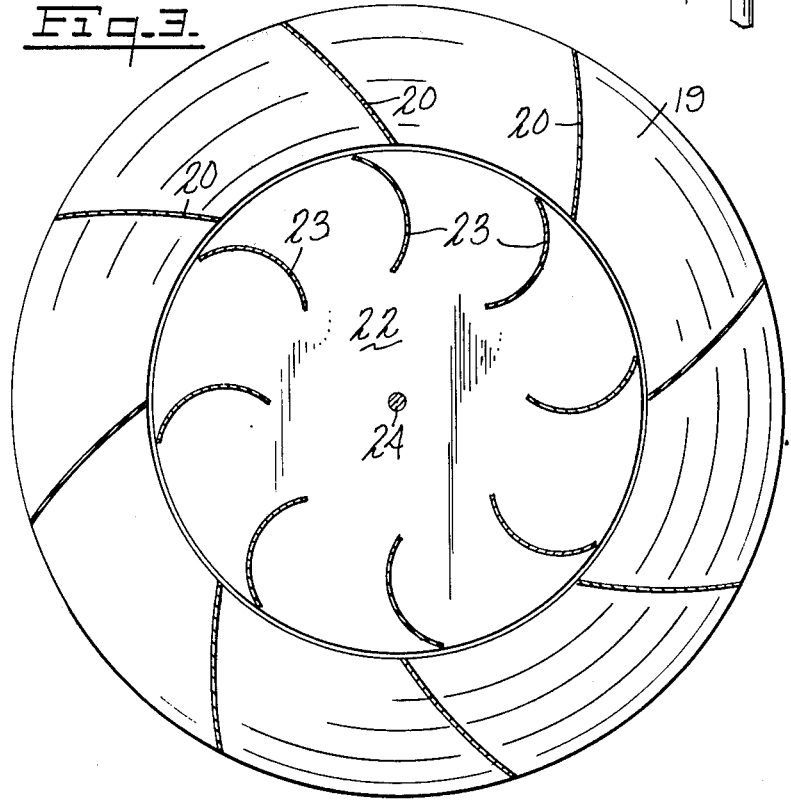
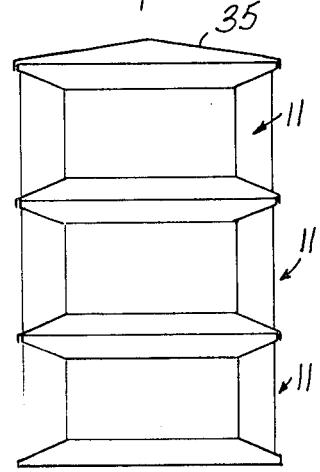

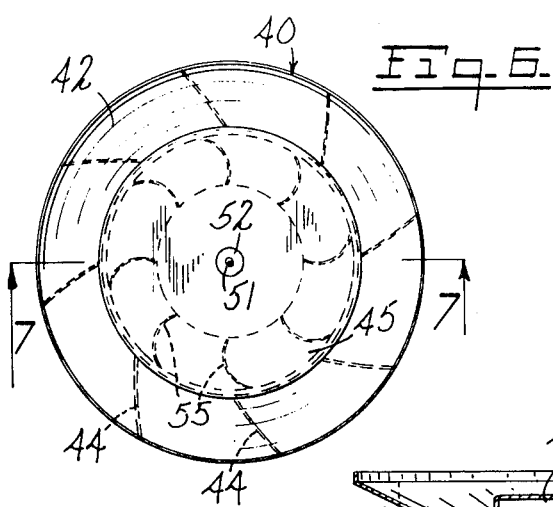
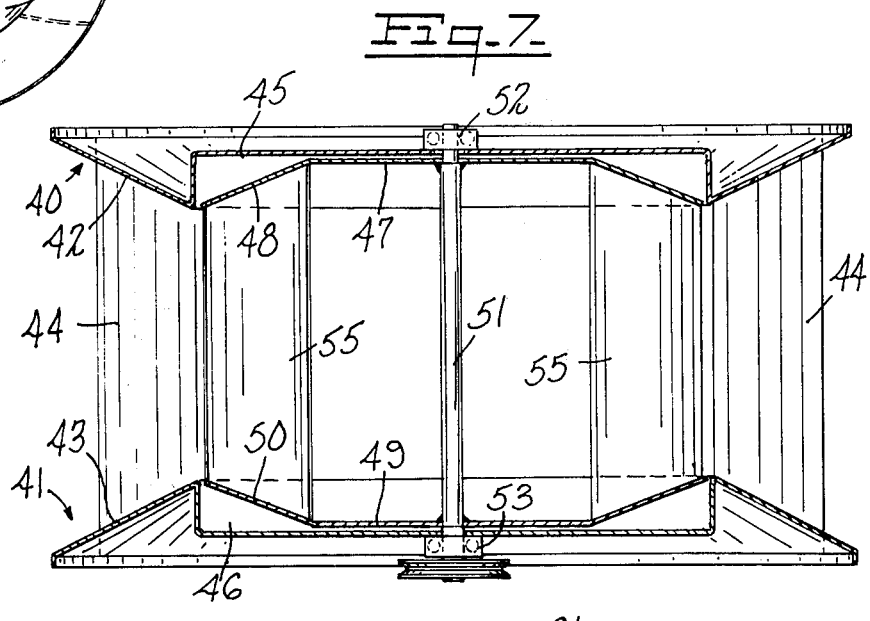
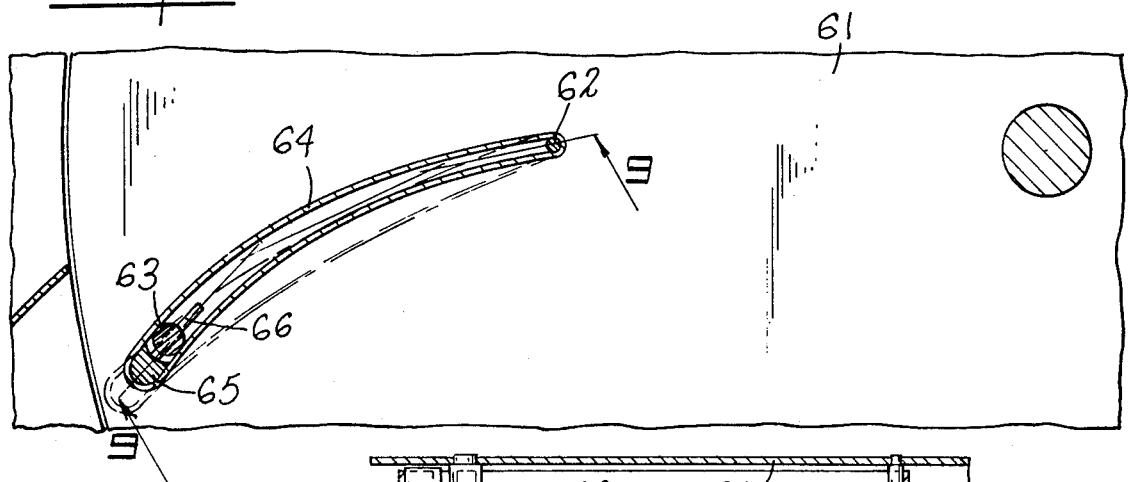
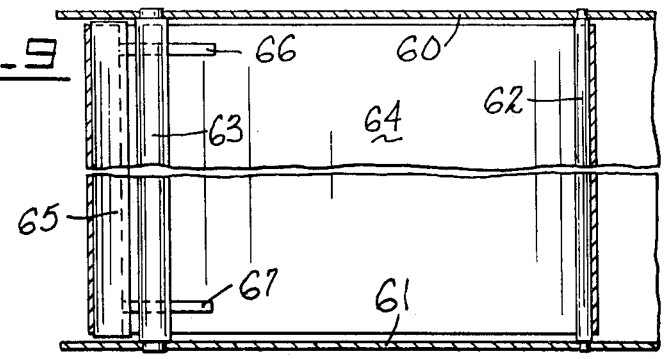

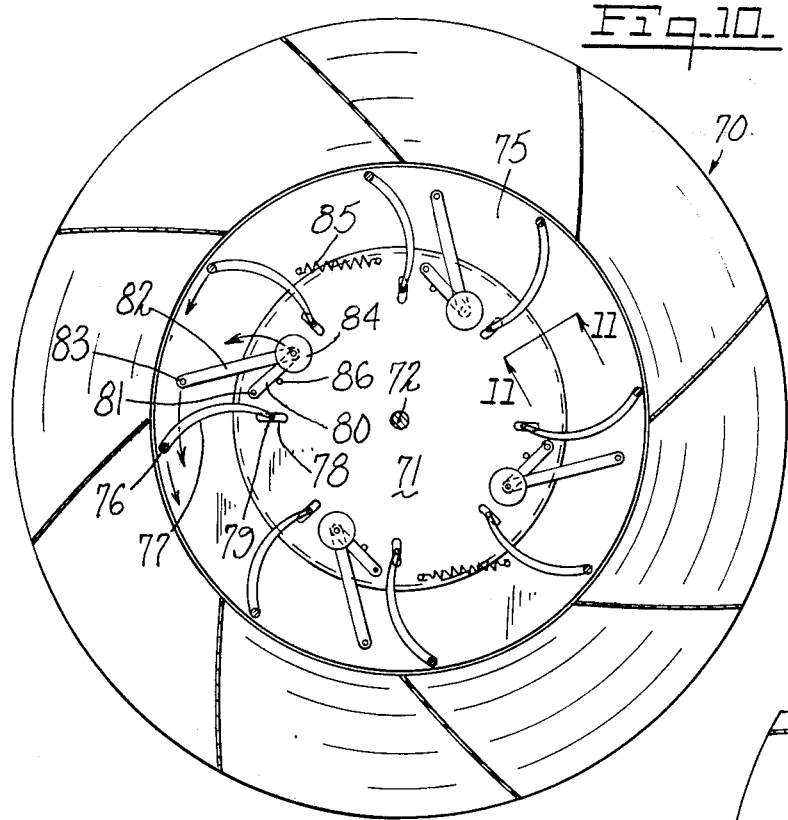
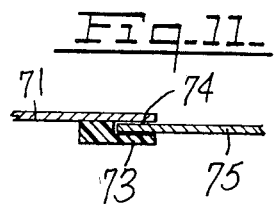
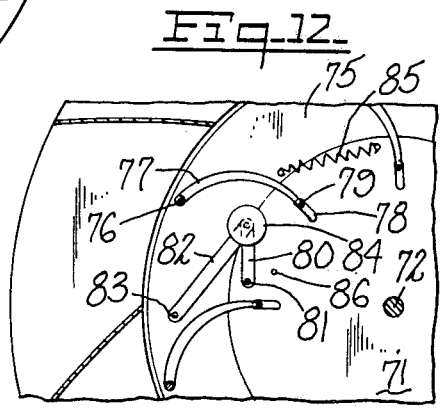
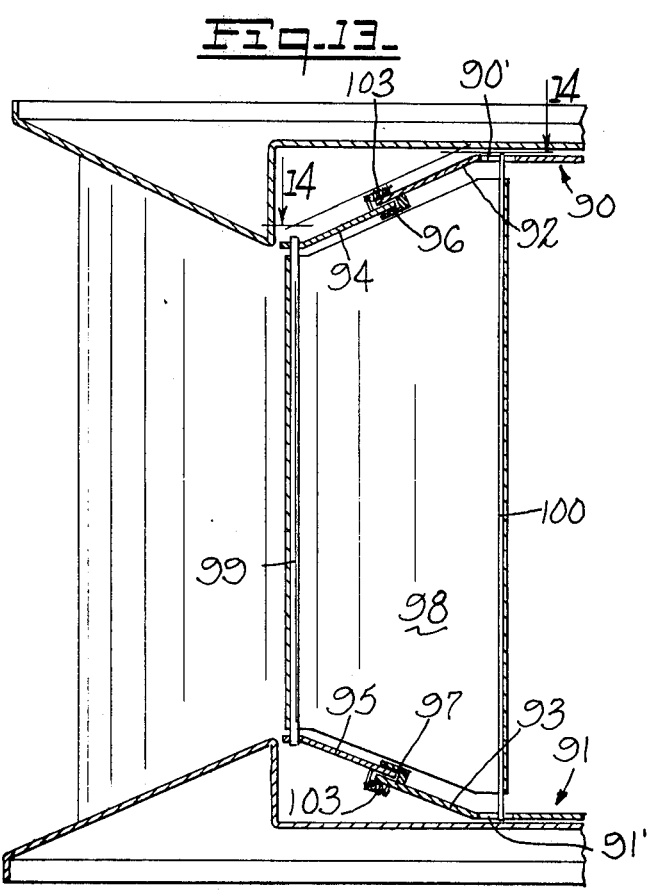
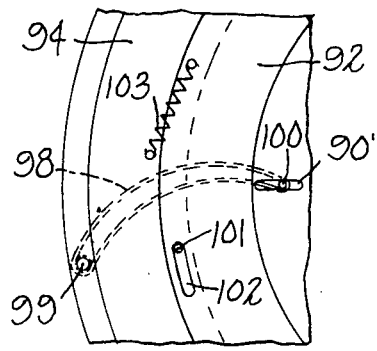

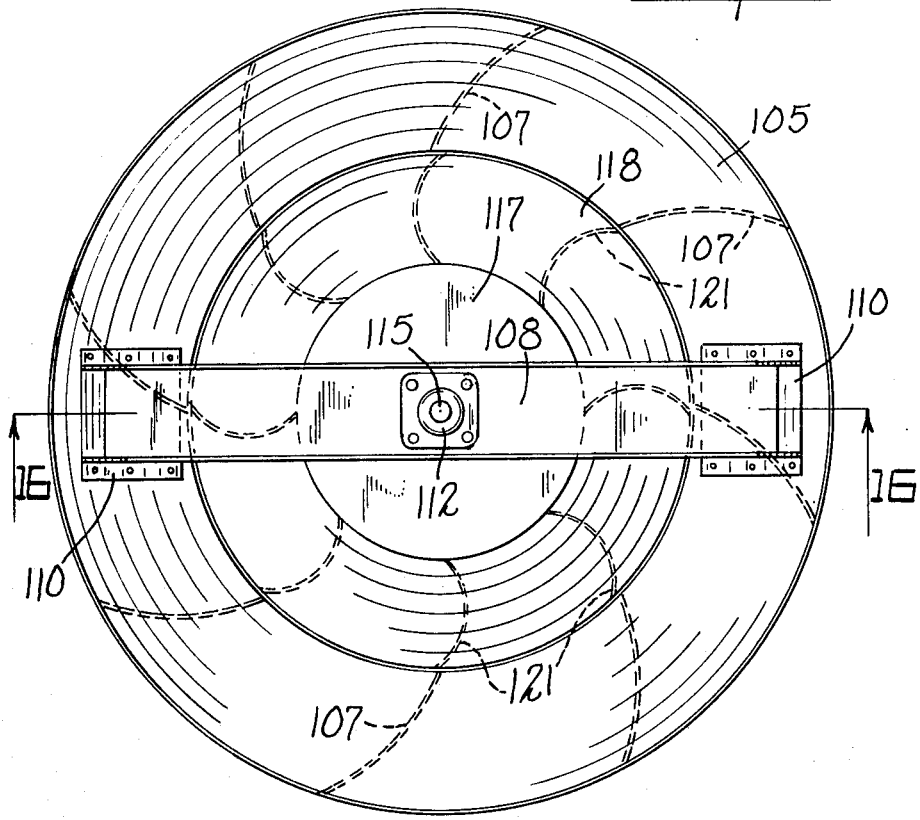
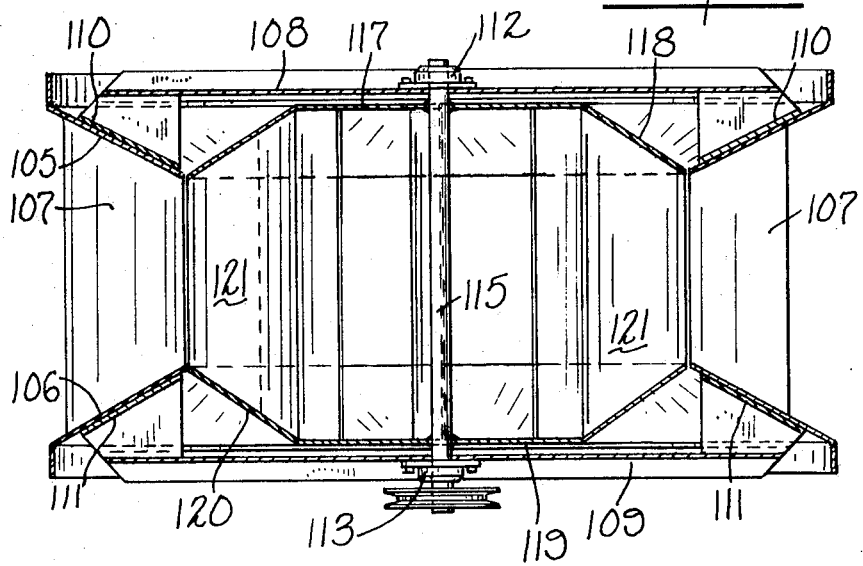

HORIZONTAL MULTIDIRECTIONAL TURBINE WINDMILL

This application is a continuation-in-part of application Ser. No. 482,355, filed June 24, 1974, now U.S. Pat. No. 3,938,907.

This invention relates to windmills of the type in which a rotor is mounted on a vertical axle and drive shaft, and in which funnel-shaped passages in a stator are disposed on all sides of the rotor, with deflecting surfaces positioned to efficiently conduct the air currents to the vanes or buckets of the rotor.

In the art of horizontally rotating windmills, it is known to provide a rotor without a housing but with a peripheral shield, movable according to the wind direction in order to cover the inactive side of the rotor while the wind acts on the exposed side. It is also known to provide windward and leeward funnel-shaped passages to direct the air flow to and from the vanes of the rotor, the funnels being movable to respond to the wind direction. Another known windmill comprises a rotor having fixed vanes surrounded by an annular casing in which are mounted flat vertical shutters which are rotated automatically (in response to wind velocity) to control the flow of wind to the rotor. It is also known to provide a rotor having flexible blades, with manual means to pre-set the amount of slack therein.

It is an object of the invention to provide a windmill wherein the cross-section of the funnel-shaped passages of the stator and the angles of the walls thereof are coordinated with the corresponding passages of the rotor to ensure efficient use of the wind currents passing therethrough.

It is a further object of the invention to provide windmill modules or units, each comprising a housing and a rotor on an axle, which are adapted to be stacked vertically with the axles interengaged to consitute a single drive shaft, driven by a plurality of rotors.

It is another object of the invention to provide, in a windmill of the character described, rotor vanes or buckets which are so proportioned as to ensure the most advantageous use of the wind energy during its passage through the rotor.

It is a further object to provide certain improvements in the form, construction and arrangement of the several parts whereby the above named and other objects may effectively be attained.

The invention accordingly comprises the features of construction, combinations of elements, and arrangement of parts which will be examplified in the constructions hereinafter described, and the scope of the invention will be indicated in the claims.

Practical embodiments of the invention are shown in the drawings, wherein:

FIG. 1 represents a perspective view of a single unit in operative position, certain details being omitted;

FIG. 2 represents a vertical axial section of a first embodiment of the invention;

FIG. 3 represents a horizontal section on the line 3—3 of FIG. 2;

FIG. 4 is a diagrammatic illustration of the manner in which a plurality of units may be stacked;

FIG. 5 represents a detail bottom plan view of the drive pulley;

FIG. 6 represents a top plan view of a modified form of unit;

FIG. 7 represents a vertical section on the line 7—7 of FIG. 6;

FIG. 8 represents a detail horizontal section of an adjustable rotor vane;

FIG. 9 represents a detail vertical section on the line 9—9 of FIG. 8;

FIG. 10 represents a top plane view of a modified form of rotor, the drive shaft and housing being in section;

FIG. 11 represents a detail vertical section on the line 11—11 of FIG. 10;

FIG. 12 represents a detail top plan view showing parts of the rotor shifted to positions different from those of FIG. 10;

FIG. 13 represents a detail vertical section of housing and rotor portions, modified from the form shown in FIG. 7;

FIG. 14 represents a detail top plan view on the line 14—14 of FIG. 13;

FIG. 15 represents a top plan view, similar to FIG. 6 of a further modified from of unit; and FIG. 16 represents a vertical section on the line 16—16 of FIG. 15.

Referring to the drawings, and particularly to FIGS. 1 to 3, the windmill comprises, as basic elements, a housing 11, rotor 12 and base 13. The housing is constituted by a top member 14, having a flat circular central portion 15 and an upwardly flaring frusto-conic rim portion 16, a bottom member 17, having a similar circular central portion 18 and downwardly flaring frusto-conic rim portion 19, and fixed vertical vanes 20 (eight being shown) connecting the respective rim portions. The vanes lie at angles of about 35° to the radius of the housing at the periphery of the rim portions and curve inwardly to lie at a smaller angle adjacent their inner edges.

The rotor is constituted by upper and lower flat discs 21, 22, connected by vertically disposed buckets 23, and mounted on axle 24. The buckets 23 are so disposed and so angled as to receive on their concave sides the streams of air which are directed in a partially tangential direction by the angled vanes 20 of the housing. They terminate inwardly at a substantial distance from the axle, leaving a central space across which the air can flow freely after acting on the windward side buckets. The axle is journaled in upper and lower bearings 25, 26 and may be provided at its upper end with a coupling element 27 for engagement with a complementary element on the bottom of another unit when they are stacked, as decribed below. The lower end of the axle extends below the bearing 26 to constitute a drive shaft on which is mounted a pulley 28.

The base 13 is shown as having legs 29, and a support 30 for the generator 31 which is driven through pulley 32 by the drive belt 33 on the pulley 28.

The top of the housing may suitably be covered by a flat conical roof 35 which is made as a separate element, to be mounted on the uppermost housing-and-rotor unit of a stack containing two or more such units. In such a plural assembly only the lowermost unit has its axle connected to the generator, each upper unit having its axle provided with a coupling adapted to engage with the element 27 of the next lower unit. A stack of three units is shown diagrammatically in FIG. 4.

In operation, the unit of FIGS. 1 to 3 will present to the wind, from any direction, at least three apertures bounded by the outer edges of the top and bottom housing members and the outer edges of the adjacent vertical vanes, each such aperture being the larger end of a funnel, the cross-sectional area of which decreases to a minimum at the inner end, adjacent the rotor. Air passing through such a funnel increases in velocity so that the stream impinging on each rotor bucket on the windward side of the unit acts to rotate the rotor at a relatively high speed. The same air is exhausted past the buckets on the down-wind side in a direction to urge the rotor in the same rotary direction. Wind passing around the sides of the unit (where its effect is neutral) tends to create a certain amount of suction on the down-wind side, drawing the air through and out of the unit with increased velocity and resulting in very efficient use of the available wind flow. The direction of the wind is quite indifferent and changes in direction, at a constant velocity, will not affect the operation of the unit.

In the form of windmill shown in FIGS. 6 and 7 the housing and rotor are modified to provide improved air-floor characteristics. The top member 40 and bottom member 41 are formed with frusto-conic rim portions 42, 43 (like portions 16, 19), joined by fixed vanes 44, but are dished so that the central portions 45, 46 are more widely spaced, vertically, than the portions 15, 18 in FIG. 2, for a unit of the same overall size. The rotor in FIG. 7 is constituted by an upper central disc 47 with a downwardly sloping annular frusto-conic portion 48, and a lower central disc 49 with an upwardly sloping frusto-conic portion 50, both mounted on an axle 51, journaled in bearings 52, 53, corresponding to bearings 25, 26 of FIG. 2. The rotor is provided with buckets (one being indicated generally at 55) which lie in the zone between the frusto-conic portions 48 and 50, leaving the central interior of the rotor open for passage of air, as noted above. In this form of rotor the inward narrowing of the spaces between adjacent pairs of buckets is partially compensated for by the vertical widening of the spaces.

The rotor vanes or buckets 23 or 55 have been shown in FIGS. 1 to 7 as being fixed and relatively rigid, but an object of the invention, as noted above, is the optional provision of buckets which are automatically adjustable. Referring to FIGS. 8 and 9, the rotor is constituted by upper and lower flat discs 60, 61 (like discs 21, 22 in FIG. 2) connected by circularly disposed arrays of inner posts 62 and outer posts 63, the outer posts being larger in diameter than the inner posts. The bucket 64 is in the form of a flat sleeve of flexible material (e.g., sheet aluminum), fitting closely against the inner post and having a partially streamlined nose piece 65 fixed in its outer folded edge. The position of the nose piece is controlled by means of upper and lower guide pins 66, 67 which pass freely through holes bored in the post 63, and the post is rotatable at least to the extent indicated in FIG. 8. The inner posts 62 are preferably located no closer to the axle 68 than about one-half the radius of the rotor, to leave free space in the center portion thereof.

In operation, the bucket 64 responds to a gentle flow of air, with slow rotation, by assuming its position of maximum curvature (approximated in full lines in FIG. 8); as the wind velocity increases and the rotor turns faster, the nose piece (having substantial mass) is urged radially outward by centrifugal force and the profile of the bucket is made flatter (broken lines in FIG. 8), as required for most efficient operation in a high speed wind stream. Such automatic adjustment of the bucket's profile is reversible, in that a lessening of the centrifugal force permits the nose piece to be drawn in toward the post 63 in response to filling of the bucket with air at a lower velocity.

Profile adjustment may be effected also by the means shown in FIGS. 10 to 14. In FIGS. 10 and 12 the housing 70 is the same as in FIGS. 1 to 3. The rotor upper and lower flat discs are replaced by two-part assemblies; since the upper assembly is the same as the lower assembly, but inverted, only the lower one is shown and described. This comprises a central flat disc 71 fixed on the axle 72 and provided with a peripheral flanges 73 (FIG. 11) to form a groove 74 adapted to receive, with a loose sliding fit, the inner edge of the flat annular plate 75. The plate 75 carries a series of outer posts 76, each connected to a similar upper annular plate (not shown) and each being encased by the outer edge fold of a flat sleeve of flexible material (like the sleeves 64) constituting a rotor bucket 77. The disc 71 is provided with radial slots 78 spaced from its periphery and inner posts 79 are secured within the inner edge folds of the buckets with their lower and upper ends lying freely in the slots of the disc 71 and of a similar upper disc (not shown).

Relative rotation of the discs and annular plates is effected by toggle and weight devices, each comprising a short lever 80 pivoted on the disc 71 at 81, a longer lever 82 pivoted on the annular plate 75 at 83, and a weight 84 mounted on the joint where levers 80 and 82 are pivotally connected. Springs 85, extending between the disc and the annular plate, exert a tangential force tending to hold each lever 80 against a stop 86. The toggle assembly (80–83) could be replaced by other mechanical means, such as bell crank, if desired.

At rest or at low velocities, the disc 71, plate 75 and associated parts are substantially in the positions shown in FIG. 10, the inner posts 79 resting at points near the inner ends of their respective slots 78. As the rotor speed increases, the weights 84 tend to move radially outward due to centrifugal force, moving from the position of FIG. 10 to that shown in FIG. 12. This causes the longer levers 82 to push the plate 75 counterclockwise relative to the disc 71, the direction of movement of the weights, plate, and posts 76 being indicated by the arrows at the left of FIG. 10. As the posts 76 move away from the respective slots 78 the angle and profile of each bucket is altered to that considered most efficient for high speed operation (FIG. 12). As the wind velocity decreases, the springs 85 act to return the disc and plate to their at-rest position. Since the upper annular plate of the rotor is secured to the lower plate 75 by the posts 76, the toggle and weight assemblies (80–84) need not be duplicated.

FIGS. 13 and 14 illustrate how the principle of FIGS. 10 to 12 can be applied to the rotor of FIG. 7. The frusto-conic portions of the top and bottom rotor members 90, 91 are divided to leave inner parts 92, 93 connected to the axle (not shown) while annular outer parts 94, 95 are rotatably engaged in grooves 96, 97 (similar to groove 74, FIG. 11). Each flexible vane or bucket 98 is carried on an outer post 99 having its ends fixed adjacent the outer peripheral edge of the parts 94, 95, and on an inner post 100 having its ends resting in slots 90', 91' in the top and bottom rotor members. A stop pin 101 in a slot 102 limits the relative rotation of the parts and a spring 103 urges the parts toward the position of rest or low speed. Rotation toward a higher speed position can be effected by means of lever and weight assemblies similar to those shown in FIG. 10.

In FIGS. 15 and 16 there is shown a power unit similar to that of FIGS. 6 and 7 but including certain features found to give good results. The top and bottom stator members comprise frusto-conic annular rim elements 105, 106, joined by fixed slightly curved vanes 107. Strong cross-beams 108, 109 are fixed to mounting plates 110, 111 at each end which are riveted and/or welded to the respective rim elements. The cross-beams are disposed diametrically of the rim elements are are provided with axle bearings 112, 113 at their midpoints to receive the rotor axle 115. The rotor is like that shown in FIGS. 6 and 7, being constituted by an upper central disc 117 bounded by a downwardly sloping annular frusto-conic portion 118, and a lower central disc 119 bounded by an upwardly sloping annular frusto-conic portion 120, both discs being mounted on the axle 115, journaled in the bearings 112, 113. The rotor is provided with curved buckets 121 extending vertically between the frusto-conic portions 118 and 120, leaving the central interior of the rotor, between discs 117 and 119 open for the horizontal passage of air without vertical leakage, just as in the case of FIGS. 6 and 7. The slope of the respective frusto-conic portions is calculated and shown as being such that tangential cross-sections of the spaces between adjacent buckets are substantially uniform in area from the periphery of the rotor to the inner edges of the buckets. The air flow which is delivered radially inward through the funnel-shaped passages of the stator, at increased velocity, thus passes through the rotor at full speed without substantial change of resistance on either the inlet or outlet side.

It will be understood that the principle of FIGS. 10 to 12 can be applied to the rotor of FIGS. 15 and 16 as explained above and illustrated in FIGS. 13 and 14.

Extensive studies of windmill technology by the Technological Development Section of the "Wind Workshop" in Washington D.C. have shown that, in known propeller type windmills the wake on the down wind side has turbulent and pressure characteristics which cause very definite and objectionable losses of power. The windmill disclosed herein, however, particularly as shown in FIGS. 15 and 16, is so designed that the negative pressure on the down wind side helps to move large volumes of air rapidly through the stator and rotor, causing the latter to start rotating with a breeze of only about 2 miles per hour.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A horizontal multidirectional windmill comprising a fixed housing and a rotor, the housing comprising upper and lower annular frusto-conic members and a plurality of vertically disposed vanes extending between said members and lying at an angle from radial, each adjacent pair of vanes and the surfaces of the frusto-conic members therebetween forming a laterally and vertically inwardly tapering funnel to direct air inwardly with a tangential component, and the rotor comprising upper and lower horizontally disposed central disc portions, the upper disc portion being bounded peripherally by an outwardly and downwardly extending upper frusto-conic member and the lower disc portion being bounded peripherally by an outwardly and upwardly extending, lower frusto-conic member, a vertical axle to which said disc portions are secured, and a plurality of buckets mounted between said last named frusto-conic portions and extending inwardly from the periphery thereof, the outer peripheries of said last named upper and lower frusto-conic members being disposed adjacent to the inner peripheries of the respective upper and lower fursto-conic members defining said tapered funnels.

2. A horizontal multidirectional windmill according to claim 1, wherein the slopes of the rotor frusto-conic portions are so calculated that tangential cross-sections of the spaces between adjacent buckets are substantially uniform in area from the periphery of the rotor to the inner edges of the buckets.

3. A horizontal multidirectional windmill according to claim 1 wherein the outer edges of the buckets lie substantially along vertical lines connecting the outer edges of the last named frusto-conic members and the inner edges of the bucket lie substantially along vertical lines connecting the inner edges of said members.

4. A horizontal multidirectional windmill according to claim 1 which includes diametrically disposed cross-beams spanning and fixed to the first named frusto-conic members, each cross-beam being provided with an axle bearing to receive the rotor axle.

5. A horizontal multidirectional windmill according to claim 1 wherein the housing includes upper and lower horizontally disposed disc portions peripherally connected to the inner peripheries of the first named frusto-conic portions, each said last named disc portions being provided with an axle bearing to receive the rotor axle.

* * * * *